US012629929B2

(12) United States Patent
Kim et al.

(10) Patent No.: US 12,629,929 B2
(45) Date of Patent: May 19, 2026

(54) METHOD FOR MANUFACTURING LAMINATED CORE

(71) Applicant: DAEWON Precision Industrial Co., LTD, Ansan-si (KR)

(72) Inventors: Jaeseok Kim, Seoul (KR); Sangwook Lee, Cheonan-si (KR); Jaeshik Lee, Seoul (KR); Sohyun Kwon, Incheon (KR); Minha Kim, Gunpo-si (KR)

(73) Assignee: DAEWON PRECISION INDUSTRIAL CO., LTD, Ansan-si (KR)

( * ) Notice: Subject to any disclaimer, the term of this patent is extended or adjusted under 35 U.S.C. 154(b) by 0 days.

(21) Appl. No.: 18/944,868

(22) Filed: Nov. 12, 2024

(65) Prior Publication Data

US 2025/0153480 A1 May 15, 2025

(30) Foreign Application Priority Data

Nov. 13, 2023 (KR) ......................... 10-2023-0156026

(51) Int. Cl.
B32B 38/08 (2006.01)
B32B 37/12 (2006.01)
B32B 37/16 (2006.01)

(52) U.S. Cl.
CPC .............. B32B 38/08 (2013.01); B32B 37/12 (2013.01); B32B 37/16 (2013.01); *B32B 2037/1253* (2013.01)

(58) Field of Classification Search
CPC ...................................................... B32B 38/08
See application file for complete search history.

(56) References Cited

U.S. PATENT DOCUMENTS

2024/0227351 A1* 7/2024 Shirasaki .................. B32B 7/12

FOREIGN PATENT DOCUMENTS

| | | | |
|---|---|---|---|
| JP | H01255526 A | * | 10/1989 |
| KR | 20210089192 A | | 7/2021 |
| KR | 20230135915 A | | 9/2023 |
| KR | 20230142262 A | | 10/2023 |
| KR | 20230145719 A | | 10/2023 |

OTHER PUBLICATIONS

Office Action for KR application No. 10-2023-0156026, dated Jul. 30, 2025, 6 pages.

* cited by examiner

*Primary Examiner* — Ian A Rummel
(74) *Attorney, Agent, or Firm* — Tarolli, Sundheim, Covell & Tummino LLP

(57) ABSTRACT

Disclosed is a method for manufacturing a laminated core, including: a laminated core manufacturing step of manufacturing a laminated core by laminating a lamina member having an adhesive layer formed on a surface thereof; an adhesive layer curing step of curing the adhesive layer by heating the laminated core by high frequency induction-heating; a resin filling step of filling a resin filling part of the laminated core with a resin; and a resin curing step of curing a resin filled in the laminated core. With this method, by curing an adhesive layer with high frequency induction-heating and filling the resin in a state in which a residual heat of the laminated core is maintained, a process for preheating the laminated core for the resin filling may be omitted, and therefore, there is an effect of saving time and expenses consumed in the pre-heating process.

5 Claims, 3 Drawing Sheets

METHOD FOR MANUFACTURING LAMINATED CORE

CROSS REFERENCE TO RELATED APPLICATION

The present application claims priority to Korea Patent Application No. 10-2023-0156026, filed Nov. 13, 2023, the entire contents of which is incorporated herein for all purposes by this reference.

FIELD

The present disclosure relates to a method for manufacturing a laminated core, more particularly, to a method for manufacturing a laminated core capable of manufacturing a laminated core through an optimized process by curing an adhesive layer by high frequency induction-heating and filling a resin in a state in which a residual heat of the laminated core is maintained.

BACKGROUND

A motor is a mechanic device which obtains a rotational force from electric energy and includes a stator and a rotor. The rotor electromagnetically interworks with the stator and rotates by a force acting by a magnetic field and a current flowing through a coil. The stator refers to a stationary part in a rotating machine such as a motor, etc., that is, a part that is fixed without rotating. For example, in the case of an inductor, the stator includes a stator core, a stator coil, etc.

Such rotor and stator may be formed with laminated cores which are manufactured by laminating lamina members, which are metal thin sheets, in the form of a plurality of layers and by integrating them.

A manufacturing method for the laminated core is known as including a method of integrally fixing the lamina member in the form of a plurality of laminated layers by using a welding fixing method using a laser welding or a rivet fixing method, etc.

However, when integrating lamina members laminated by the welding fixing method, there is a problem in that thermal deformation occurs to the lamina member because of the welding heat, and the property thereof is changed.

Therefore, recently, an adhesion fixing method which adheres the lamina members, a unit thin sheet of the laminated core, to one another and integrating them has been proposed. The adhesion fixing method is disclosed in Korea patent No. 10-1996-003021 and Japan Patent No. 5-304037.

Among the patent literatures, referring to Japan Patent No. 5-304037, a steel plate, which is a material for manufacturing a motor core, is supplied to a first press molding machine and a second press molding machine by a transfer roller, and an adhesive is coated on the steel plate using an application roller and a nozzle before the steel plate passes through the first press molding machine.

In addition, the laminated core is manufactured such that the lamina members stacked sequentially in an internal space of the first press molding machine and the second press molding machine through blanking of the material are integrated into one using the adhesive. According to such a conventional method for manufacturing the adhesive type laminated core, expenses can be saved because of a laser welding, and the steel sheets may correspond to the thinning.

However, when applying the method for manufacturing the adhesive type laminated core, a heating process and a cooling process for curing the adhesive are added.

For example, to provide rapid heating of the laminated core, a high frequency induction-heating method may be applied. However, the high frequency induction-heating method has an effect of heating a thing to a high temperature for a short period time, but has a problem in that considerable temperature deviation per position of the laminated core is generated and some adhesive substance is lost because of a high heat and the adhesive becomes to be fragile due to a thermal shock during a cooling process, thereby the quality of the laminated core is deteriorated.

PRIOR ART LITERATURE

Patent Literature (Patent Literature 1) Korea Patent No. 10-1996-003021 (Jan. 26, 1996)
(Patent Literature 2) Japan Parent No. 5-304037 (Nov. 16, 1993)

SUMMARY

The present disclosure is conceived to solve the above-described problem, and an object of the present disclosure is to provide a method for manufacturing the laminated core capable of manufacturing the laminated core through an optimized process by curing an adhesive layer with high frequency induction-heating and filling a resin in a state in which a residual heat of the laminated core is maintained.

One embodiment is a method for manufacturing a laminated core, including: a laminated core manufacturing step of manufacturing a laminated core by laminating a lamina member having an adhesive layer formed on a surface thereof; an adhesive layer curing step of curing the adhesive layer by heating the laminated core by high frequency induction-heating; a resin filling step of filling a resin filling part of the laminated core with a resin; and a resin curing step of curing a resin filled in the laminated core.

At this instance, the resin filling step may be performed in the resin curing step in a state in which a residual heat of the laminated core heated in the resin curing step is maintained.

For example, in the resin curing step, the laminated core may be heated to 200 to 220° C., and in a state in which the laminated core is at 160 to 190° C., the resin filling step may be performed.

In addition, in the laminated core manufacturing step, the laminated core may be manufactured by laminating the lamina member manufactured by blanking a thin sheet having the adhesive layer, formed of an adhesive manufactured by combining two kinds of materials, on a surface thereof a plurality of times.

In addition, in the resin curing step, a high frequency induction-heating coil may be disposed on an outer peripheral surface and may heat the laminated core to a target temperature.

For example, the laminated core may be configured as a stator, and in the resin filling step, a resin may be supplied to form an insulation layer having a certain thickness on an inner peripheral surface of a hairpin inserting hole formed along a circumferential direction of the laminated core.

As another example, the laminated core may be configured as a rotor, and in the resin filling step, a magnet may be inserted into a magnet inserting hole formed along a circumferential direction of the laminated core, and a resin may be filled in the magnet inserting hole.

According to the method for manufacturing the laminated core according to the present disclosure, by curing an adhesive layer with high frequency induction-heating and filling a resin in a state in which a residual heat of the laminated core is maintained, a process for preheating the laminated core for the resin filling may be omitted, and therefore, there is an effect of saving time and expenses consumed in the pre-heat process.

DETAILED DESCRIPTION

Figure 1:
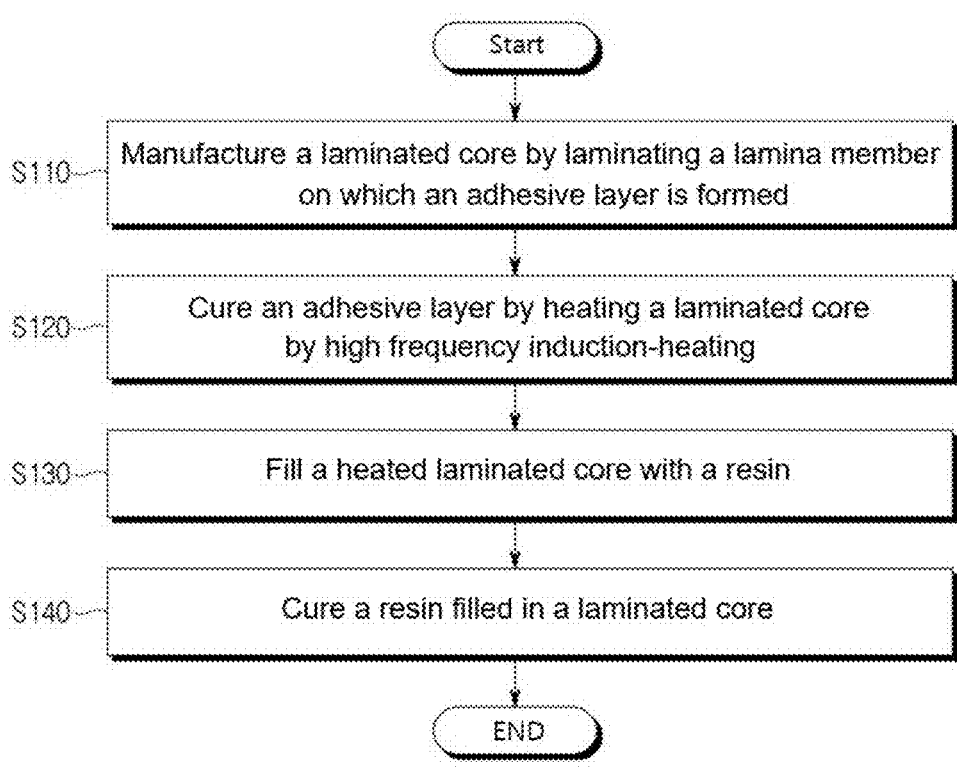
FIG. 1 is a flowchart schematically illustrating a method for manufacturing a laminated core according to an embodiment of the present disclosure.

Hereinafter, a detailed description will be given as to the embodiments of the present invention with reference to the accompanying drawings.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

The terms used in the present application are used to describe only specific embodiments or examples, and are not intended to limit the present disclosure. A singular expression can include a plural expression as long as it does not have an apparently different meaning in context.

Although not defined otherwise, all terms including technical terms and scientific terms used herein have the same meanings as those generally understood by a person having ordinary knowledge in the art to which the present invention pertains. Terms defined in a dictionary generally used are additionally interpreted as having a meaning consistent with the related art documents and contents currently disclosed, and unless defined otherwise, are not interpreted as having an ideal or very official meaning.

Hereinafter, embodiments of the present invention will be described in detail with reference to the accompanying drawings.

FIG. 1 is a flowcharts schematically illustrating a method for manufacturing a laminated core according to an embodiment of the present disclosure. In addition, FIG. 2 is a view schematically illustrating an embodiment of a laminated core manufactured according to a method for manufacturing a laminated core according to an embodiment of the present disclosure, and FIG. 3 is a view schematically illustrating another embodiment of a laminated core manufactured according to a method for manufacturing a laminated core according to an embodiment of the present disclosure.

Figure 2:
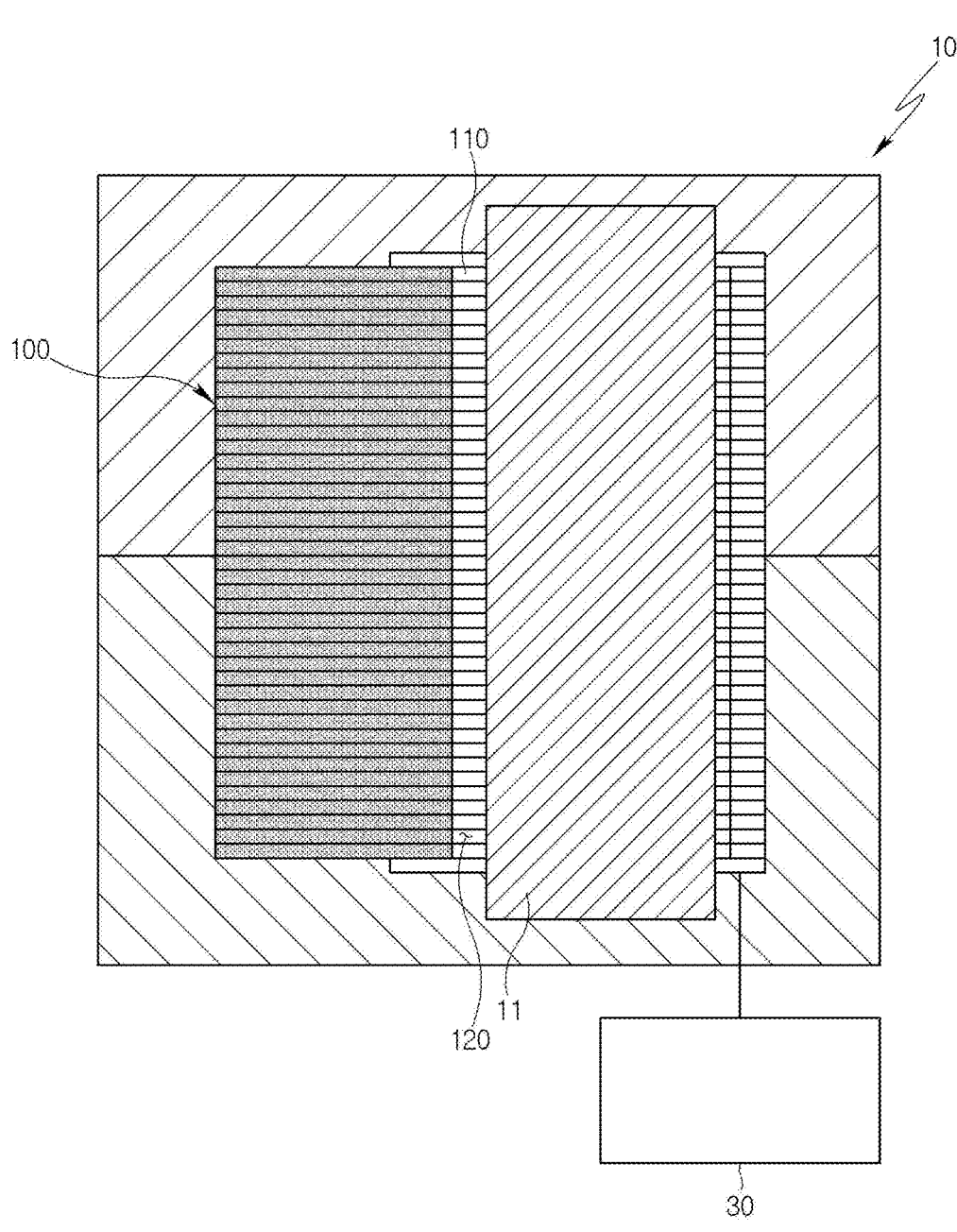
FIG. 2 is a view schematically illustrating an embodiment of a laminated core manufactured according to a method for manufacturing a laminated core according to an embodiment of the present disclosure.
Figure 3:
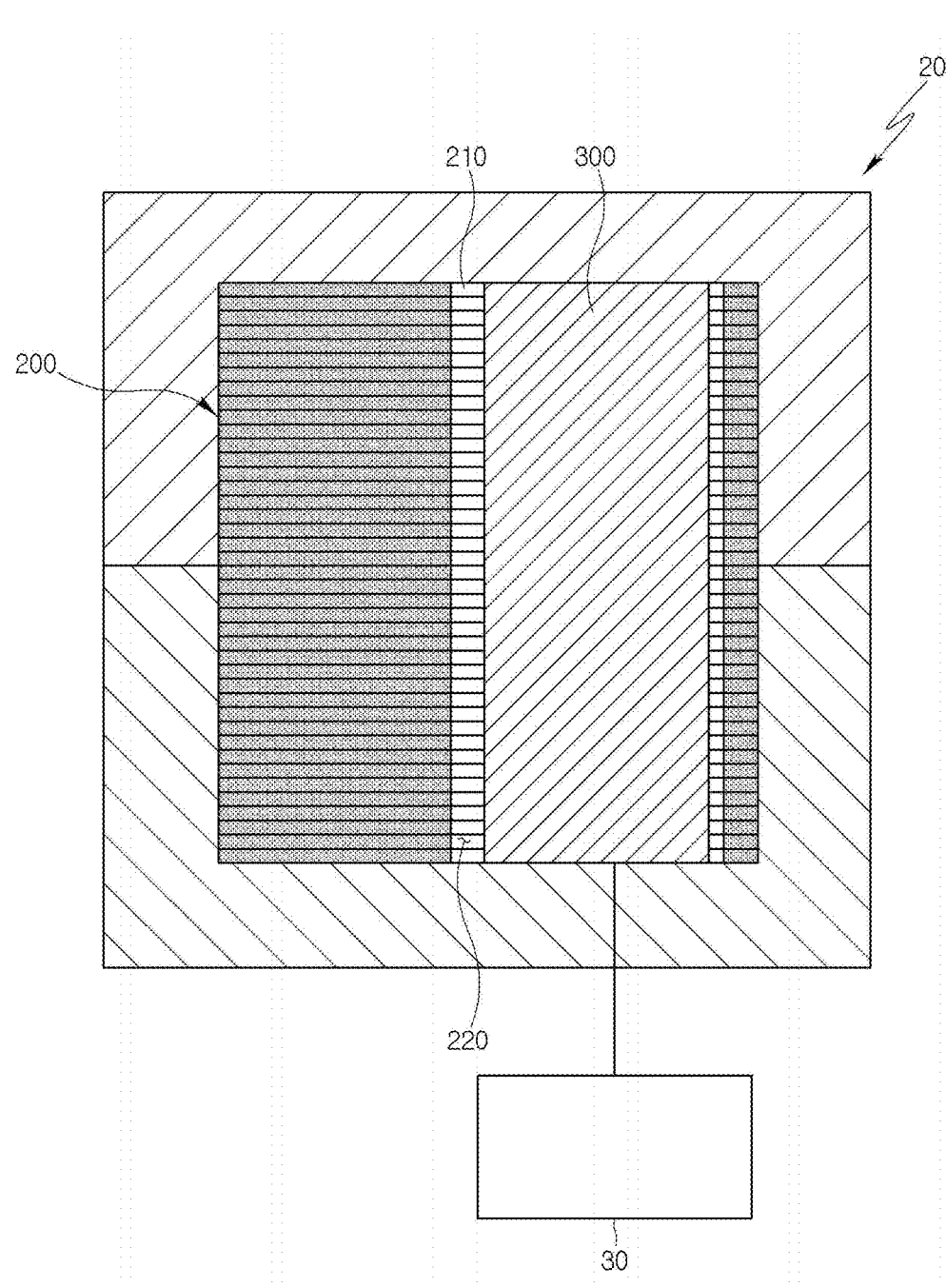
FIG. 3 is a view schematically illustrating another embodiment of a laminated core manufactured according to a method for manufacturing a laminated core according to an embodiment of the present disclosure.

Referring to FIGS. 1 to 3, a method for manufacturing a laminated core according to an embodiment of the present disclosure may include a laminated core manufacturing step S110 of manufacturing a laminated core by laminating a lamina member having an adhesive layer formed on a surface thereof; an adhesive layer curing step S120 of curing the adhesive layer by heating the laminated core by high frequency induction-heating; a resin filling step S130 of filling a resin filling part of the laminated core with a resin; and a resin curing step S140 of curing a resin filled in the laminated core.

In more detail, the laminated core manufacturing step S110 may manufacture the laminated core by providing a thin sheet having an adhesive layer on a surface thereof to pass through a press apparatus so as to form a shape of a laminated core, and laminating a lamina member formed by blanking the thin sheet on which the shape is impressed.

Here, the laminated core may be configured such that an adhesive at a room temperature is applied to the lamina member and the lamina members are laminated to be integrated into one, or such that an embossing is formed on the lamina member and as the lamina members are laminated, the lamina members are fitted and fastened to each other, thereby being integrated into one.

In addition, in the laminated core manufacturing step S110, the laminated core may be manufactured such that the lamina member manufactured by blanking a thin sheet having the adhesive layer, formed of an adhesive manufactured by combining two kinds of materials, on a surface thereof is laminated a plurality of times.

Here, the adhesive forming the adhesive layer may be an adhesive manufactured by combining an epoxy resin and a polyurethane resin. The epoxy resin has a problem of an adhesion intensity being deteriorated when a shock or vibration is applied to an adhered portion, and therefore, in order to provide elasticity to the epoxy resin, an adhesive which is manufactured by combining two kinds of materials, the polyurethane resin combined with the epoxy resin, and is capable of strengthening an impact resistance is used. That is, although flexibility of the epoxy resin is poor, high temperature properties of the epoxy resin is excellent, and flexibility of the polyurethane resin is excellent, high temperature properties of the polyurethane resin is poor. Therefore, by combining the polyurethane resin and the epoxy resin with each other, advantages can be secured and shortcomings can be complemented.

In addition, in the adhesive layer curing step S120, a high frequency induction-heating coil is disposed on an outer peripheral surface of the laminated core and heats the laminated core to a target temperature. That is, the present disclosure may heat the laminated core to a high temperature for a short period time by high frequency induction-heating. At this instance, it may be configured to leave the laminated core to maintain the target temperature for a certain period of time.

Here, the target temperature for heating the laminated core may be set at 200 to 220° C. That is, when using the adhesive formed by combining the polyurethane resin and the epoxy resin with each other, a temperature lower than a vaporization temperature of the polyurethane resin, which is a relatively higher temperature, is set as the target temperature. In general, a vaporization temperature of the polyurethane resin is about 240° C., therefore, it is preferable to set the target temperature of the polyurethane resin to be 200 to 220° C. It is apparent that the target temperature for heating the laminated core may be changed according to a kind of the adhesive.

In the resin filling step S130, after forming the laminated core by integrating the plurality of lamina members in the adhesive layer curing step S120, a resin filling part of the laminated core is filled with the resin.

For example, as illustrated in FIG. 2, the laminated core 100 may be configured as a stator.

As such, when the laminated core 100 is configured as the stator, the resin filling step may be configured such that a resin is supplied to form an insulation layer having a certain thickness on an inner peripheral surface of a hairpin inserting hole 110 formed along a circumferential direction of the laminated core 100.

To this end, in the adhesive layer curing step S120, the laminated core 100 of which the adhesive layer is cured is disposed on an insertion mold 10. At this instance, a resin filling part 120 is formed such that the resin is filled in the resin filling part 120 as an insert pin 11 is inserted into the hairpin inserting hole 110, and the resin is filled in the resin filling part 120 through a resin supply part 30.

With this configuration, an insulation layer having a certain thickness may be formed on an inner peripheral surface of the hairpin inserting hole 110.

As another example, as illustrated in FIG. 3, the laminated core 200 may be configured as a rotor.

As described above, when the laminated core 200 is configured as the rotor, the resin filling step may be performed such that a magnet 300 is inserted into a magnet inserting hole 210 formed along a circumferential direction of the laminated core 200 and the resin is filled in the magnet inserting hole 210.

To this end, in the adhesive layer curing step S120, the laminated core 200 of which the adhesive layer is cured is disposed on a mold 20. At this instance, a resin filling part 220 may be configured such that the resin is filled in the resin filling part 220 as the magnet 300 is inserted into the magnet inserting hole 210, and the resin is filled in the resin filling part 220 through the resin supply part 30.

With this configuration, by filling the resin in the magnet inserting hole 210, the magnet 300 may be fastened and fixed to the magnet inserting hole 210.

As such, the laminated core manufactured according to the method for manufacturing the laminated core according to an embodiment of the present disclosure may be applied to both the rotor and the stator.

In addition, the resin filling step S130 is performed in a state in which a residual heat of the laminated core, heated in the adhesive layer curing step S120, is maintained. That is, in order to fill the resin in the laminated core, the laminated core should be pre-heated first. Therefore, according to the method for manufacturing the laminated core according to an embodiment of the present disclosure, the laminated core is heated in the adhesive layer curing step S120, therefore, the laminated core is not heated additionally after proceeding directly from the adhesive layer curing step S120 to the resin filling step S130, but instead, the resin is filled in a state in which a residual heat of the laminated core, which is heated in the adhesive layer curing step S120, is maintained.

For example, the laminated core is heated to a temperature of 200 to 220° C. in the adhesive layer curing step S120, the heated laminated core is disposed on the mold of the resin filling apparatus, and in a state in which the laminated core is at 160 to 190° C., the resin may be filled.

As described above, the resin is filled in a state in which the adhesive layer is cured by high frequency induction-heating, and a residual heat of the laminated core is maintained, therefore, a process for preheating the laminated core additionally for filling the resin may be omitted and time and expenses which may be consumed in the process may be saved.

The present invention has been described in detail with reference to the exemplary embodiments, but the exemplary embodiments are illustrative and the present invention is not limited thereto. It is apparent that those skilled in the art may modify or improve the exemplary embodiments within the technical spirit of the present invention.

All of the simple modifications or changes of the present invention belong to the scope of the present invention, and the specific scope of the present invention May be apparent by the accompanying claims.

REFERENCE NUMERALS

100: laminated core
110: hairpin inserting hole
200: laminated core
210: magnet inserting hole

What is claimed is:

1. A method for manufacturing a laminated core, comprising:

a laminated core manufacturing step of manufacturing a laminated core by laminating a lamina member having an adhesive layer formed on a surface thereof;

an adhesive layer curing step of curing the adhesive layer by heating the laminated core to 200° C. to 220° C. with high frequency induction-heating;

a resin filling step performed immediately after the adhesive layer curing step in a state in which residual heat of 160° C. to 190° C. is maintained, the resin filling step including filling a resin filling part of the laminated core with a resin; and a resin curing step of curing the resin filled in the laminated core.

2. The method of claim 1, wherein in the laminated core manufacturing step, the laminated core is manufactured by laminating the lamina member manufactured by press cutting a thin sheet having the adhesive layer, formed of an adhesive manufactured by combining two kinds of materials, on a surface thereof a plurality of times.

3. The method of claim 1, wherein in the resin curing step, a high frequency induction-heating coil is disposed on an outer peripheral surface and heats the laminated core to a target temperature.

4. The method of claim 1, wherein the laminated core is configured as a stator, and wherein in the resin filling step, a resin is supplied to form an insulation layer having a certain thickness on an inner peripheral surface of a hairpin inserting hole formed along a circumferential direction of the laminated core.

5. The method of claim 1, wherein the laminated core is configured as a rotor, and wherein in the resin filling step, a magnet is inserted into a magnet inserting hole formed along a circumferential direction of the laminated core, and a resin is filled in the magnet inserting hole.

* * * * *